US008103558B2

(12) United States Patent
Glasglow

(10) Patent No.: US 8,103,558 B2
(45) Date of Patent: Jan. 24, 2012

(54) METHODS, SYSTEMS, AND COMPUTER-READABLE MEDIA FOR PLACING ORDERS

(75) Inventor: Jay Oliver Glasglow, Acworth, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1218 days.

(21) Appl. No.: 11/781,579

(22) Filed: Jul. 23, 2007

(65) Prior Publication Data

US 2009/0030708 A1    Jan. 29, 2009

(51) Int. Cl.
*G06Q 30/00* (2006.01)
(52) U.S. Cl. ....................... 705/27.2; 705/26.1
(58) Field of Classification Search ............... 705/26.27
See application file for complete search history.

(56) References Cited

U.S. PATENT DOCUMENTS

| | | | | | |
|---|---|---|---|---|---|
| 5,826,242 | A | * | 10/1998 | Montulli | 705/26.8 |
| 5,991,739 | A | * | 11/1999 | Cupps et al. | 705/26.8 |
| 7,287,002 | B1 | * | 10/2007 | Asher et al. | 705/26.8 |
| 7,886,964 | B2 | * | 2/2011 | Steinecker | 235/379 |
| 2001/0044754 | A1 | * | 11/2001 | Fujii et al. | 705/26 |
| 2002/0038259 | A1 | * | 3/2002 | Bergman et al. | 705/26 |
| 2002/0077929 | A1 | * | 6/2002 | Knorr et al. | 705/26 |
| 2002/0123940 | A1 | * | 9/2002 | Spets | 705/26 |
| 2003/0126016 | A1 | * | 7/2003 | Asano | 705/15 |
| 2004/0030605 | A1 | * | 2/2004 | Ling | 705/26 |
| 2006/0011720 | A1 | * | 1/2006 | Call | 235/383 |
| 2006/0212365 | A1 | * | 9/2006 | Mori et al. | 705/26 |
| 2007/0016490 | A1 | * | 1/2007 | Nowak | 705/26 |
| 2007/0022214 | A1 | * | 1/2007 | Harcourt | 709/246 |
| 2007/0239556 | A1 | * | 10/2007 | Wagner | 705/26 |
| 2007/0265006 | A1 | * | 11/2007 | Washok et al. | 455/435.1 |
| 2008/0262972 | A1 | * | 10/2008 | Blake | 705/75 |

OTHER PUBLICATIONS

PR Newswire, "Peachtree software introduces Peachtree office accounting easy accounting that integrates with microsoft office to improve business productivity", Dated May 18, 1998.*

* cited by examiner

*Primary Examiner* — Mark Fadok
(74) *Attorney, Agent, or Firm* — Thomas, Kayden, Horstemeyer & Risley, LLP

(57) ABSTRACT

Included are embodiments for customized ordering. At least one embodiment of a method includes receiving an indication to send a previously created customized order to a vendor and retrieving at least one component of the customized order according to the indication. Some embodiments include determining the vendor associated with the customized order and sending the at least one component of the customized order to the vendor in a first manner, the vendor being configured to receive the customized order.

20 Claims, 16 Drawing Sheets

FIG. 6

METHODS, SYSTEMS, AND COMPUTER-READABLE MEDIA FOR PLACING ORDERS

BACKGROUND

In ordering products and services from vendors, users often are provided with a plurality of options to customize the order. As such, if a user is ordering the products and/or services online, a plurality of web pages may be presented to the user before the order is complete. Similarly, if a user is placing a telephone order, the user may be presented with an Interactive Voice Response (IVR) system with a plurality of options and/or may discuss the order with a representative before placing the order. While these techniques of placing an order may provide convenience in that a user need not drive to a vendor site, place the order, and wait for the goods and/or services, oftentimes the user repeatedly places the same order with a particular vendor. Regardless, oftentimes, the user must still navigate the same web pages, IVR prompts, and/or representative questions. Such a configuration may slow the ordering process, as well as incorporate an unnecessary risk of error in the order.

Thus, a heretofore unaddressed need exists in the industry to address the aforementioned deficiencies and inadequacies.

SUMMARY

Included are embodiments for customized ordering. At least one embodiment of a method includes receiving an indication to send a previously created customized order to a vendor and retrieving at least one component of the customized order according to the indication. Some embodiments include determining the vendor associated with the customized order and sending the at least one component of the customized order to the vendor in a first manner, the vendor being configured to receive the customized order.

Also included are embodiments of a computer readable medium for customized ordering. At least one embodiment includes first receiving logic configured to receive an indication to send a previously created customized order to a vendor and retrieving logic configured to retrieve at least one component of the customized order according to the indication. Some embodiments include first determining logic configured to determine the vendor associated with the customized order and first sending logic configured to send the customized order to the vendor in a first manner, the vendor being configured to receive the customized order.

Also included are embodiments of a server for customized ordering. At least one embodiment includes a first receiving component configured to receive an indication to send a previously created customized order to a vendor and a retrieving component configured to retrieve at least one component of the customized order according to the indication. Some embodiments include a first determining component configured to determine the vendor associated with the customized order and a first sending component configured to send the customized order to the vendor in a first manner, the vendor being configured to receive the customized order.

Other systems, methods, features, and advantages of this disclosure will be or become apparent to one with skill in the art upon examination of the following drawings and detailed description. It is intended that all such additional systems, methods, features, and advantages be included within this description, be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

FIG. 6 is an exemplary embodiment of a user interface that may be presented to a user in response to selection of the continue option from FIG. 5.

DETAILED DESCRIPTION

Figure 1:
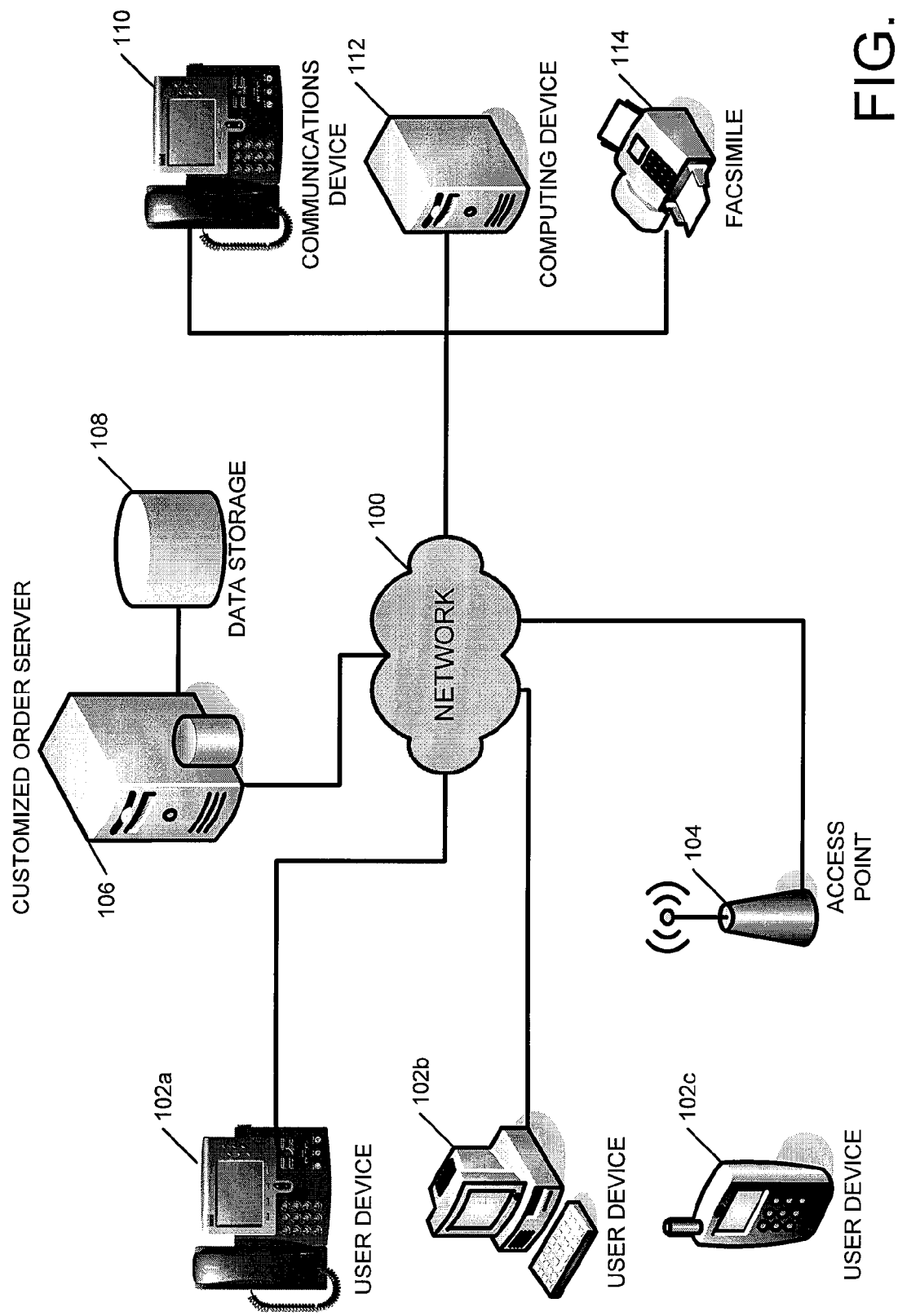
FIG. 1 is a network diagram illustrating an exemplary embodiment of components that may be utilized in placing an order with a vendor.

FIG. 1 is a network diagram illustrating an exemplary embodiment of components that may be utilized in placing an order with a vendor. As illustrated in the nonlimiting example of FIG. 1, a user can place an order for products and/or services via a network 100. More specifically, in at least one exemplary embodiment, a user communicating on a user device 102a may place a call to a vendor at a communications device 110. In this nonlimiting example, the user can place an order with an employee at a pizza vendor. Generally speaking, the employee may ask a series of questions related to the pizza order before the order is complete.

Additionally, embodiments of this disclosure also include a user on a user device 102b placing an order with an online vendor via network 100. More specifically, the user may access a website that is provided by a computing device 112, such as a web server. The user can navigate a plurality of web pages provided by the computing device 112 until the order has been submitted. As indicated above, the user may be asked to navigate a plurality of web pages each time the user visits the website being provided by the computing device 112. Similarly, a user device 102b may be configured to send a facsimile message to a facsimile machine 114 for ordering products and/or services. Similarly, user device 102c may be configured to perform one or more of the functions described above in a wireless fashion, via communication with an access point 104, cellular tower (not shown) and/or other wireless communication medium.

Additionally included in the nonlimiting example of FIG. 1 are a customized order server 106 and a data storage component 108. As discussed in more detail below, customized order server 106 may be configured to facilitate customized ordering of goods and/or services with the devices 110, 112, 114. More specifically, in at least one exemplary embodiment, one or more of the user devices 102a-102c may be configured with customized order options for ordering goods and/or services from a vendor. As a nonlimiting example, the user device 102a may be configured to display one or more customized vendors, which may be defined by the user, the vendor, and/or a provider of the customized service. Additionally, some embodiments may be configured to utilize customized ordering without utilization of the customized order server 106 for at least a portion of the ordering process.

Figure 2:
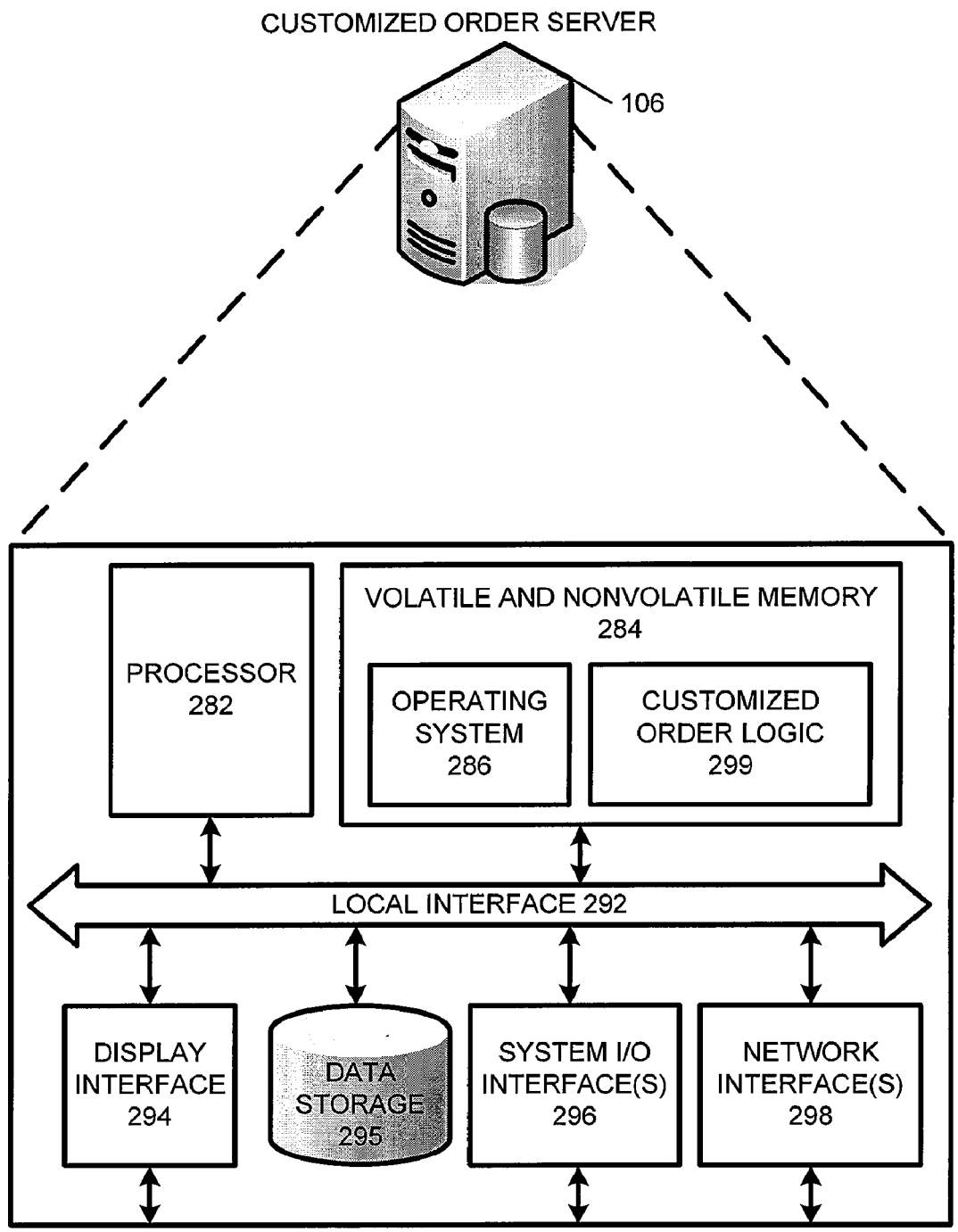
FIG. 2 is a diagram illustrating an exemplary embodiment of components that may be present in a customized order server, such as the customized order server from FIG. 1.

FIG. 2 is a diagram illustrating an exemplary embodiment of components that may be present in a customized order server 106, such as the customized order server from FIG. 1. Although a wire-line communications device is illustrated, this discussion can be applied to wireless devices, as well. Generally, in terms of hardware architecture, as shown in FIG. 2, the customized order server 106 includes a processor 282, volatile and nonvolatile memory 284, a display interface 294, data storage 295, one or more input and/or output (I/O) device interface(s) 296, and/or one or more network interfaces 298 that are communicatively coupled via a local interface 292. The local interface 292 can include, for example but not limited to, one or more buses and/or other wired or wireless connections. The local interface 292 may have additional elements, which are omitted for simplicity, such as controllers, buffers (caches), drivers, repeaters, and receivers to enable communications. Further, the local interface 292 may include address, control, and/or data connections to enable appropriate communications among the aforementioned components. The processor 282 may be a device for executing software, particularly software stored in volatile and nonvolatile memory 284. The processor 282 can include any custom made or commercially available processor, a central processing unit (CPU), an auxiliary processor among several processors associated with the communications device 106, a semiconductor based microprocessor (in the form of a microchip or chip set), a macroprocessor, and/or generally any device for executing software instructions.

The volatile and nonvolatile memory 284 can include any one or combination of volatile memory elements (e.g., random access memory (RAM, such as DRAM, SRAM, SDRAM, etc.)) and/or nonvolatile memory elements (e.g., ROM, hard drive, tape, CDROM, etc.). Moreover, the memory 284 may incorporate electronic, magnetic, optical, and/or other types of storage media. One should note that the memory 284 can have a distributed architecture (where various components are situated remote from one another), but can be accessed by the processor 282.

The software in the memory 284 may include one or more separate programs, which may include an ordered listing of executable instructions for implementing logical functions. In the example of FIG. 2, the software in the volatile and nonvolatile memory 284 may include customized order logic 299, as well as an operating system 286. The operating system 286 may be configured to control the execution of other computer programs and provides scheduling, input-output control, file and data management, memory management, and communication control and related services.

A system component and/or module embodied as software may also be construed as a source program, executable program (object code), script, or any other entity comprising a set of instructions to be performed. When constructed as a source program, the program is translated via a compiler, assembler, interpreter, or the like, which may or may not be included within the volatile and nonvolatile memory 284, so as to operate properly in connection with the operating system 286.

The Input/Output devices that may be coupled to system I/O Interface(s) 296 may include input devices, for example but not limited to, a keyboard, mouse, scanner, touch screen, microphone, etc. Further, the Input/Output devices may also include output devices, for example but not limited to, a printer, display, speaker, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

According to exemplary embodiments, the server 106 includes one or more network interfaces 298 for facilitating communication with one or more other devices. More specifically, the network interface 298 may include any component configured to facilitate a connection with another device. While in some embodiments, among others, the customized order server 106 can include a network interface 298 that includes a Personal Computer Memory Card International Association (PCMCIA) card (also abbreviated as "PC card") for receiving a wireless network card, other configurations can include the communications hardware within the customized order server 106, such that a wireless network card is unnecessary for communicating wirelessly. Similarly, other embodiments include network interfaces 298 for communicating via a wired connection. Such interfaces may be configured with Universal Serial Bus (USB) interfaces, serial ports, and/or other interfaces.

If customized order server 106 includes a personal computer, workstation, or the like, the software in the volatile and nonvolatile memory 284 may further include a basic input output system (BIOS) (omitted for simplicity). The BIOS is a set of software routines that initialize and test hardware at startup, start the operating system 286, and support the transfer of data among the hardware devices. The BIOS is stored in ROM so that the BIOS can be executed when the customized order server 106 is activated.

When the customized order server 106 is in operation, the processor 282 may be configured to execute software stored within the memory 284, to communicate data to and from the memory 284, and to generally control operations of the customized order server 106 pursuant to the software. Software in the memory 284, in whole or in part, may be read by the processor 282, perhaps buffered within the processor 282, and then executed.

One should note that while the description with respect to FIG. 2 includes a customized order server 106 as a single component, this is a nonlimiting example. More specifically, in at least one embodiment, customized order server 106 can include a plurality of servers, personal computers, and/or other devices. Similarly, while the description of FIG. 2 describes a customized order server 106, this is also a nonlimiting example, as other components, such as the user device 102a and/or other components may also be included in this description.

Additionally, while customized order logic 299 is illustrated in FIG. 2 as a single software component, this is also a nonlimiting example. In at least one embodiment, the customized order logic 299 may include one or more components, embodied in software, hardware, and/or firmware. Additionally, while customized order logic 299 is depicted as residing on a single computing device, such as customized order server 106, customized order logic 299 may include one or more components residing on one or more different devices.

The embodiments disclosed herein can be implemented in hardware, software, firmware, or a combination thereof. At least one embodiment disclosed herein is implemented in software and/or firmware that is stored in a memory and that is executed by a suitable instruction execution system. If implemented in hardware, as in an alternative embodiment, embodiments disclosed herein can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 3:
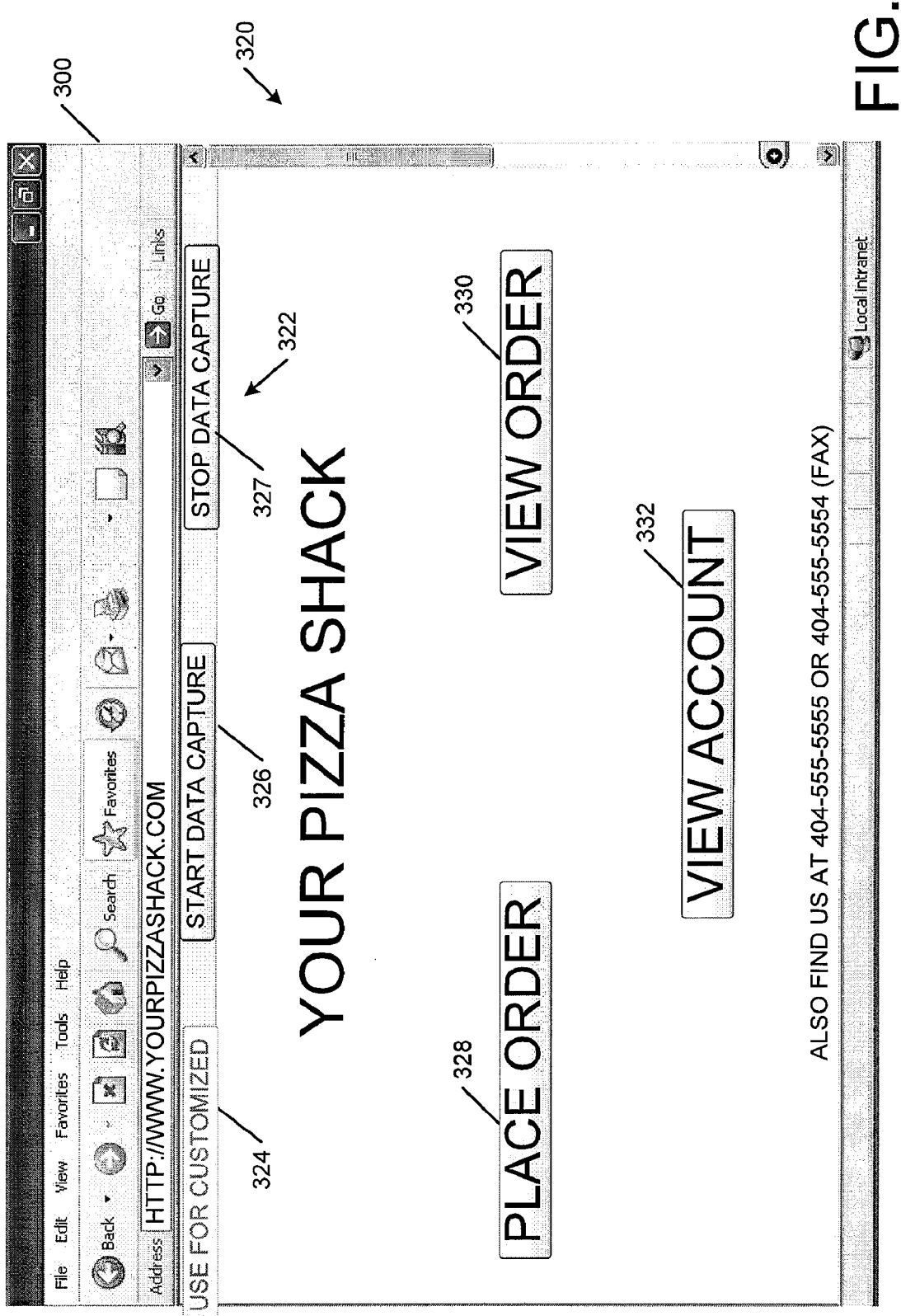
FIG. 3 is an exemplary embodiment of a user interface that may be presented to a user from a vendor's website, such as may be provided by a server from FIG. 1.

FIG. 3 is an exemplary embodiment of a user interface 320 that may be presented to a user from a vendor's website, such as may be provided by a server, such as the computing device 112 from FIG. 1. More specifically, the user device, such as the user device 102b may include browser logic for presenting a browser display 300 to the user. In response to instantiating the browser logic (which may be part of the customized order logic 299 and/or included as a separate logical component) and requesting the "Your Pizza Shack" website, the browser logic may display the browser display 300 and the user interface 320. The user interface 320 can include a place order option 328, a view order option 330, and a view account option 332. The place order option 328 may be configured to facilitate a user placing an order with the vendor "Your Pizza Shack." The view order option 330 may be configured to facilitate presentation of one or more previously placed orders. The view account option 332 may be configured to facilitate presentation and amendment of the user's account settings.

According to exemplary embodiments, also included in the browser display 300 is a customized toolbar 322. The customized toolbar 322 may be associated with the customized order logic 299 and may be configured facilitate capture of data for customized ordering. More specifically, upon instantiating the "Your Pizza Shack" web page, the customized order logic 299 can determine whether the vendor Your Pizza Shack is registered with the customized service. If Your Pizza Shack is not registered with the customized service, options 326 and 327 may be presented to the user for starting and stopping data capture for the customized service. If Your Pizza Shack is registered with the customized service, the options 324 and 326 may be deactivated and the user can select option 324.

In operation, a vendor may register with the customized order service by reaching an agreement to provide information to the customized order service provider for ordering products and/or services. Upon receiving this data, the customized order service provider may configure the customized order server 106 and/or the user device 102 such that the user's account may be configured for future ordering based on the structure of Your Pizza Shack's business and/or website model. If, Your Pizza Shack is not registered with the customized service, the user may still utilize the customized capabilities, however the user may select the start data capture option 326 to begin a data scrape associated with the present order. When the user is finished ordering, the user may select the stop data capture option 327. Upon receipt of the scraped data, the user device 102 and/or the customized order server 106 may be configured to determine a technique for facilitating future customized ordering with Your Pizza Shack.

Additionally, if Your Pizza Shack is registered with the customized service, the user may select the option 324 to use this order for future customized ordering (thus overriding default and/or previously stored customized settings). While in some embodiments options 326, 327 may be utilized at the beginning of the ordering process, option 324 may be utilized at any time during the ordering process.

Figure 4:
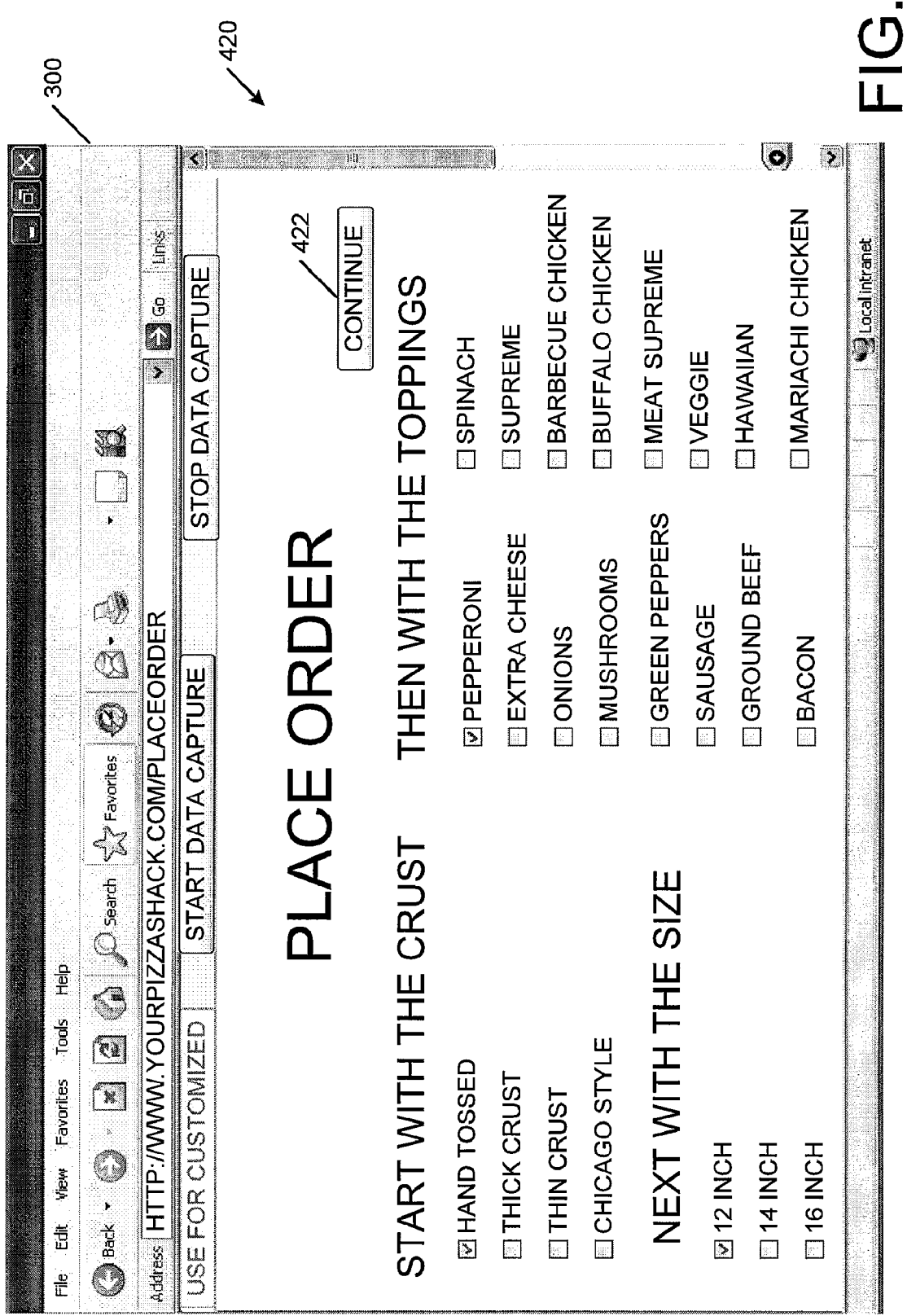
FIG. 4 is an exemplary embodiment of a user interface that may be presented to a user in response to selection of the place order option from FIG. 3.

FIG. 4 is an exemplary embodiment of a user interface 420 that may be presented to a user in response to selection of the place order option 328 from FIG. 3. As illustrated in the nonlimiting example of FIG. 4, the browser display 300 can present the user with the user interface 420 for placing an order with the vendor Your Pizza Shack. More specifically, the vendor Your Pizza Shack may provide the user with a plurality of options for ordering a pizza. Upon selection of the desired pizza options, the user can select a continue option 422.

Figure 5:
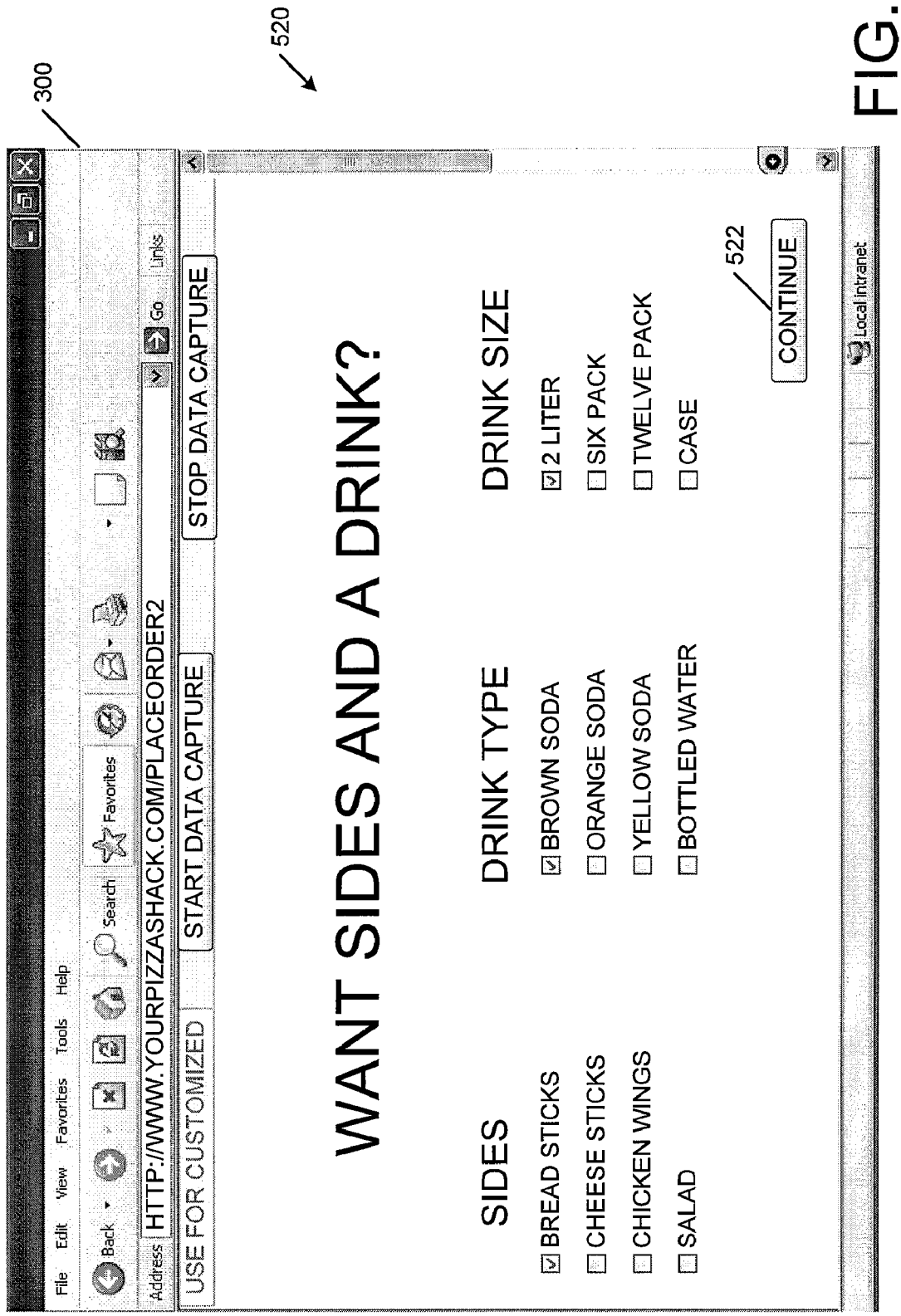
FIG. 5 is an exemplary embodiment of a user interface that may be presented to a user in response to selection of the continue option from FIG. 4.

FIG. 5 is an exemplary embodiment of a user interface 520 that may be presented to a user in response to selection of the continue option 422 from FIG. 4. As illustrated in the nonlimiting example of FIG. 5, the user may further be presented with a plurality of options for ordering other items, such as drinks and sides. Upon selection of the desired drinks and sides, the user may select a continue option 522.

Figure 6:
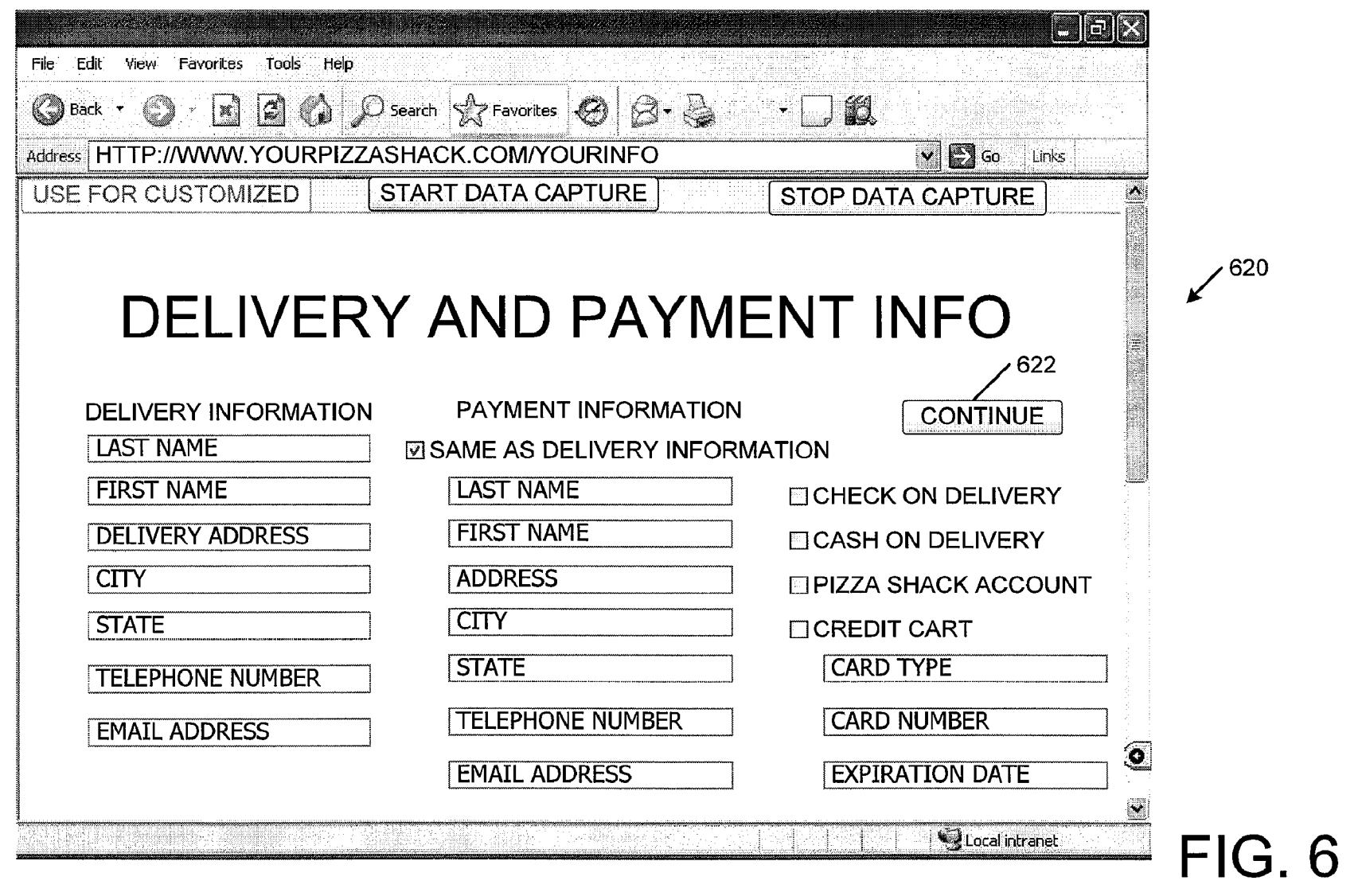

FIG. 6 is an exemplary embodiment of a user interface 620 that may be presented to a user in response to selection of the continue option 522 from FIG. 5. More specifically, as illustrated in the nonlimiting example of FIG. 6, the user is prompted to input his or her delivery information, billing information, and payment information. Upon inputting the requested data, the user can select a continue option 622 to proceed with the order.

Figure 7:
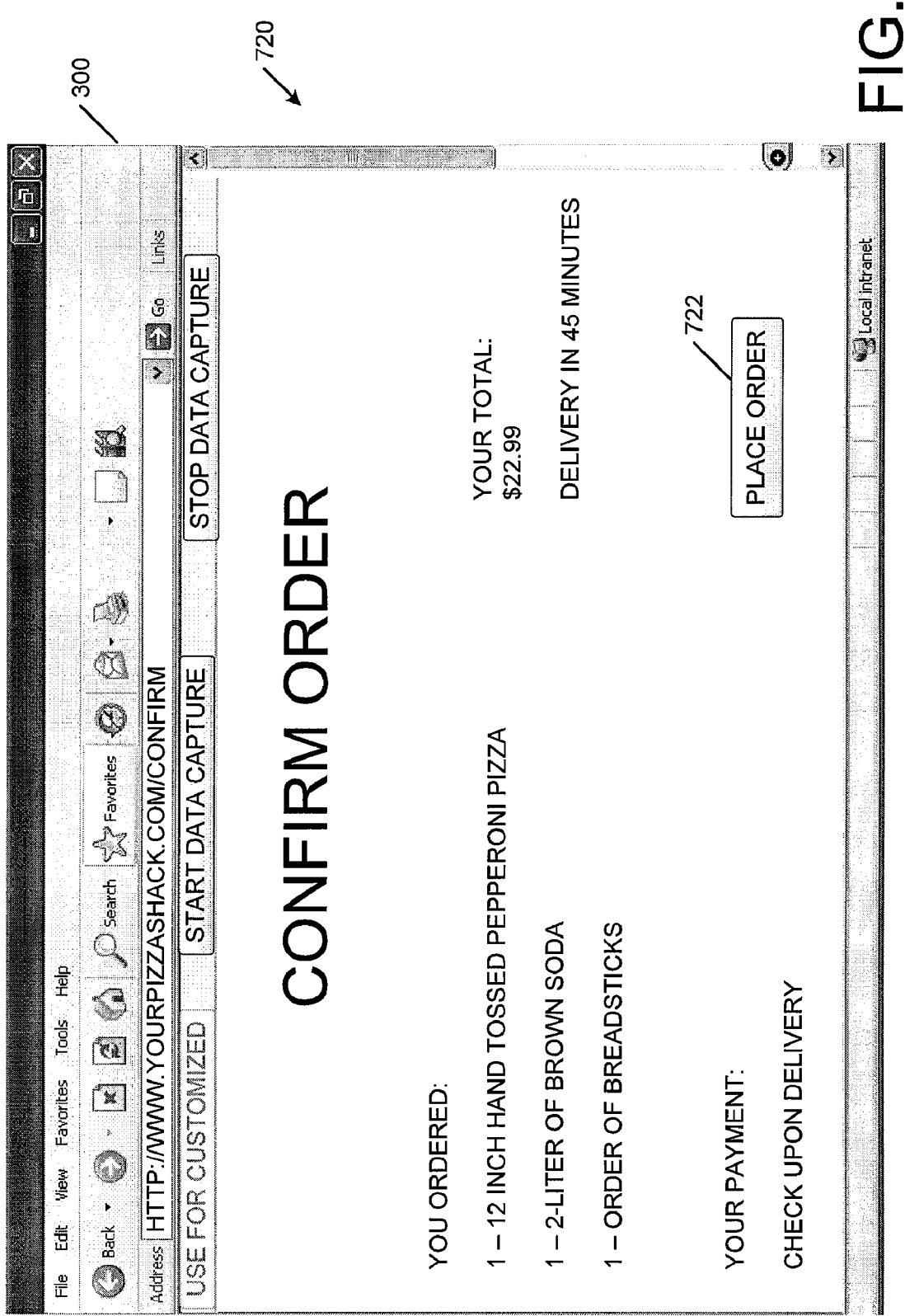
FIG. 7 is an exemplary embodiment of a user interface that may be presented to a user in response to selection of the continue option from FIG. 6.

FIG. 7 is an exemplary embodiment of a user interface 720 that may be presented to a user in response to selection of the continue option 622 from FIG. 6. As illustrated in the nonlimiting example of FIG. 7, the browser display 300 may be configured to present the user interface 720 for confirming the order from FIGS. 3-6. More specifically, data related to the order may be presented to the user prior to submitting the order. Upon confirming the order, the user may select a place order option 722. The order may then be submitted to Your Pizza Shack for processing.

Figure 8:
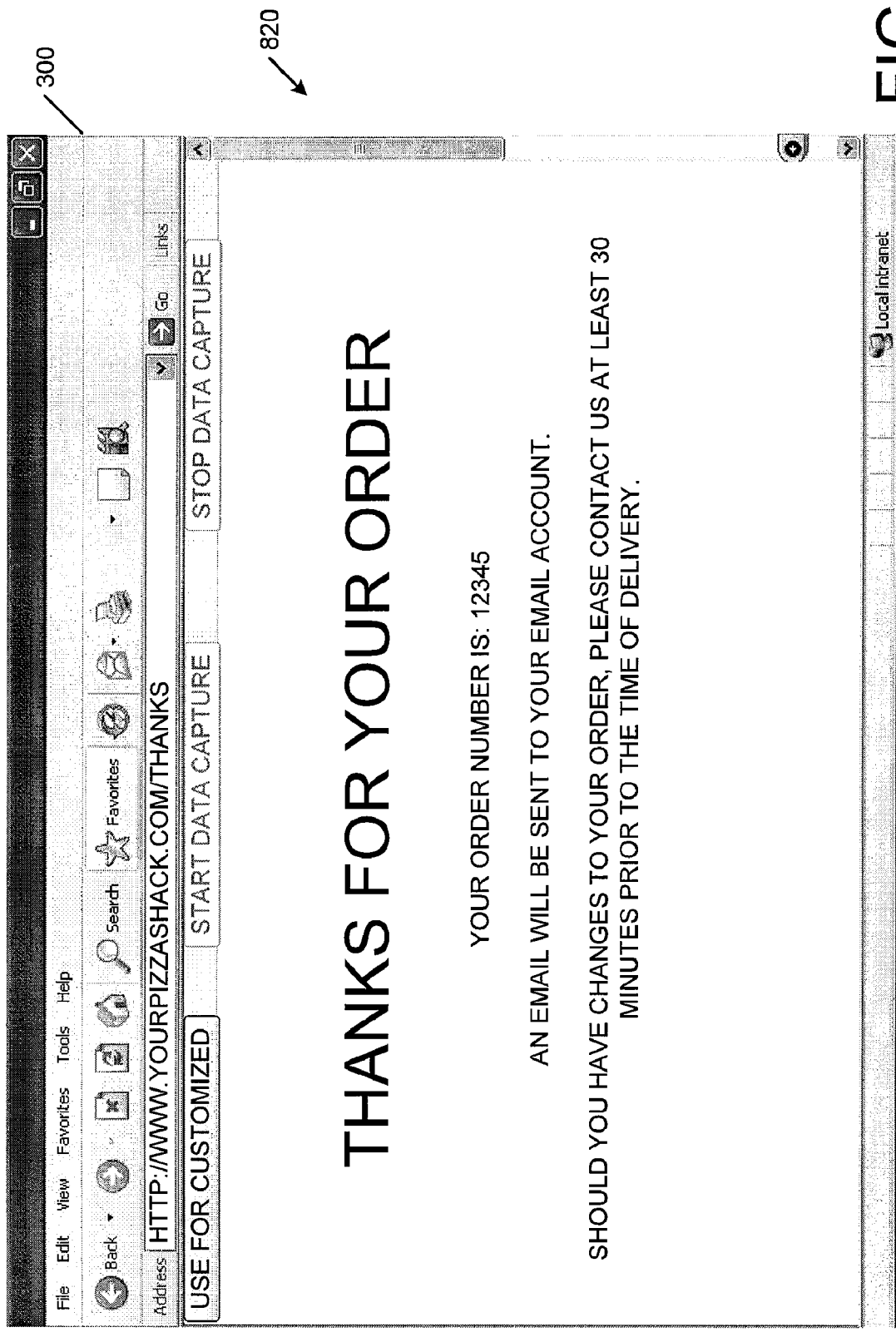
FIG. 8 is an exemplary embodiment of a user interface that may be presented to a user in response to selection of the place order option from FIG. 7.

FIG. 8 is an exemplary embodiment of a user interface 820 that may be presented to a user in response to selection of the place order option 722 from FIG. 7. As illustrated in the nonlimiting example of FIG. 8, the user interface 820 may be configured to provide the user confirmation that the order was received and is currently being processed.

As illustrated in the nonlimiting examples of FIGS. 3-8, in the absence of customized ordering functionality, a user may navigate a plurality of web pages before completing the order. While such a configuration may facilitate the ordering process, oftentimes, a user desires the same order as previously used without having to complete the full ordering process.

Figure 9:
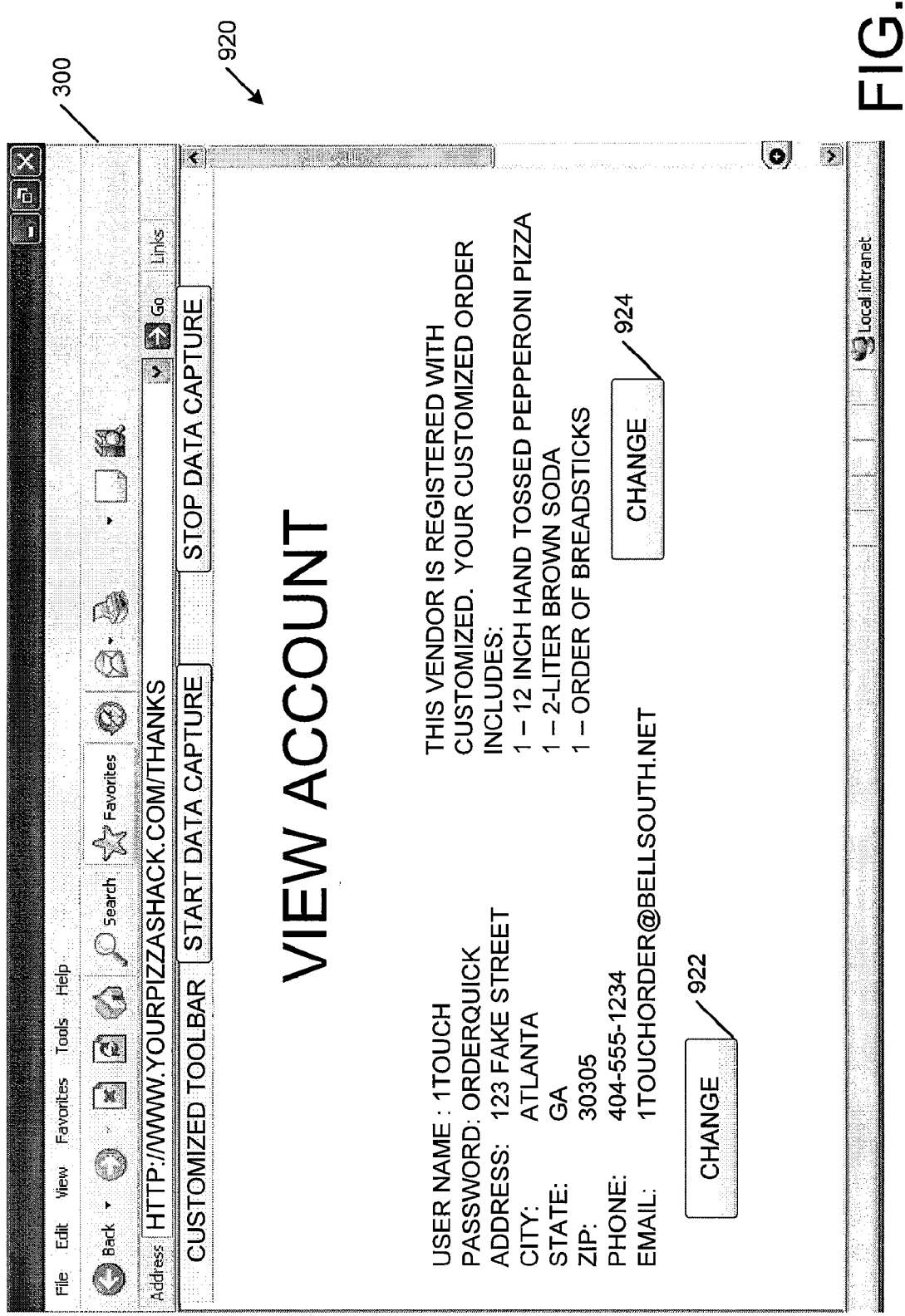
FIG. 9 is an exemplary embodiment of a user interface that may be presented to a user in response to selection of a view account option from FIG. 3.

FIG. 9 is an exemplary embodiment of a user interface 920 that may be presented to a user in response to selection of the view account option 332 from FIG. 3. As illustrated in the nonlimiting example of FIG. 9, a user can view and/or change user information via a change option 922. Additionally, the user can view and/or change customized information via a change option 924. In this nonlimiting example, the vendor Your Pizza Shack is registered with the customized service. As such, the user can set customized ordering options without having to place an order at this time.

In response to setting and/or changing the customized order options, the vendor communications device 110, the user device, such as the user device 102, and/or the customized order server 106 may receive the updated information for future use. In at least one nonlimiting example, the vendor communications device 110 stores the information, such that any user device 102a, 102b, 102c, with proper authentication can send a customized signal to place an order according to the customized options. Additionally, some embodiments may be configured such that upon setting customized options, the user device 102 is configured to receive a customized command and send data related to the customized order. The user device 102 may be configured to send the order data to the customized order server 106 and/or one or more of the vendor devices 110, 112, 114. Similarly, other embodiments can be configured to utilize the customized order server 106 to receive a customized command from the user device 102 and send the appropriate order data to one or more of the vendor devices 110, 112, 114.

Figure 10:
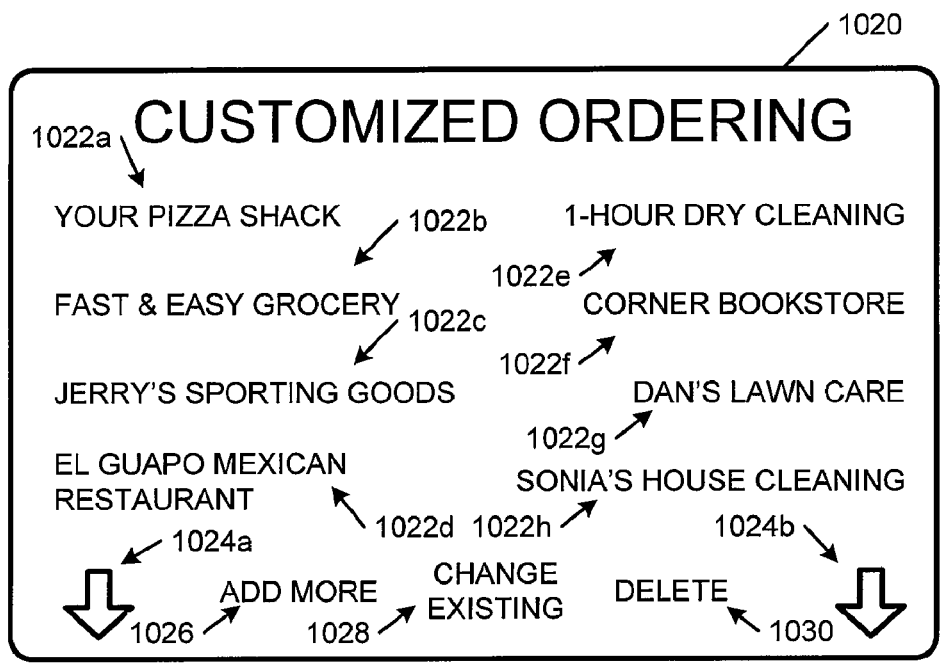
FIG. 10 is an exemplary embodiment of a user interface that may be presented to a user for customized ordering, such as from a user device from FIG. 1.

FIG. 10 is an exemplary embodiment of a user interface 1020 that may be presented to a user for customized ordering, such as from the user device 102b from FIG. 1. As illustrated in the nonlimiting example of FIG. 10, the user interface 1020 may be presented via the user device 102b, which may include a personal computer, cellular telephone, a BellSouth® Personal Device top (BPD), a Quickconnect™ device, a Kitchen Broadband Device (KBD), other general purpose device, and/or other specific purpose device configured for facilitating customized ordering.

The user interface 1020 may be configured to display one or more selectable options associated with customized ordering. More specifically, the nonlimiting example of the user interface 1020 is configured to display selectable options 1022a-1022h, which, according to exemplary embodiments, include names of vendors that are registered with the ordering service described herein. Upon selection of one or more of the options 1022, an order may be automatically placed with the selected vendor. Additionally, scroll options 1024a, 1024b may be configured to view additional customized vendors associated with the user. Additionally, the user interface 1020 may also include an option for adding additional vendors to the customized vendor list of the user interface 1020. By selecting an add more option 1026, the user may be presented with an option to designate an additional vendor and/or an option to designate the customized order for this vendor.

Similarly, the user interface 1020 may also include a change existing option 1028 for changing the display order of vendors in the user interface 1020, changing the display name of the vendors of the user interface 1020, changing the order associated with the customized order options and/or changing other portions of the customized ordering configuration. Additionally, one or more vendors may be removed from the user interface 1020 by selecting a delete option 1030.

One should note that, while the description above relates to ordering from the vendor Your Pizza Shack, this is a nonlimiting example. More specifically, as illustrated in FIG. 10, customized ordering can be applied to any of a plurality of different vendors. Additionally, depending on the particular configuration, a vendor may be listed as a plurality of customized ordering options. More specifically, in at least one exemplary embodiment, El Guapo Mexican Restaurant may be listed twice (under the same name or different names). A first occurrence of this vendor can include a customized order option for a first order and a second occurrence can include a customized order option for a second order with this vendor.

Figure 11:
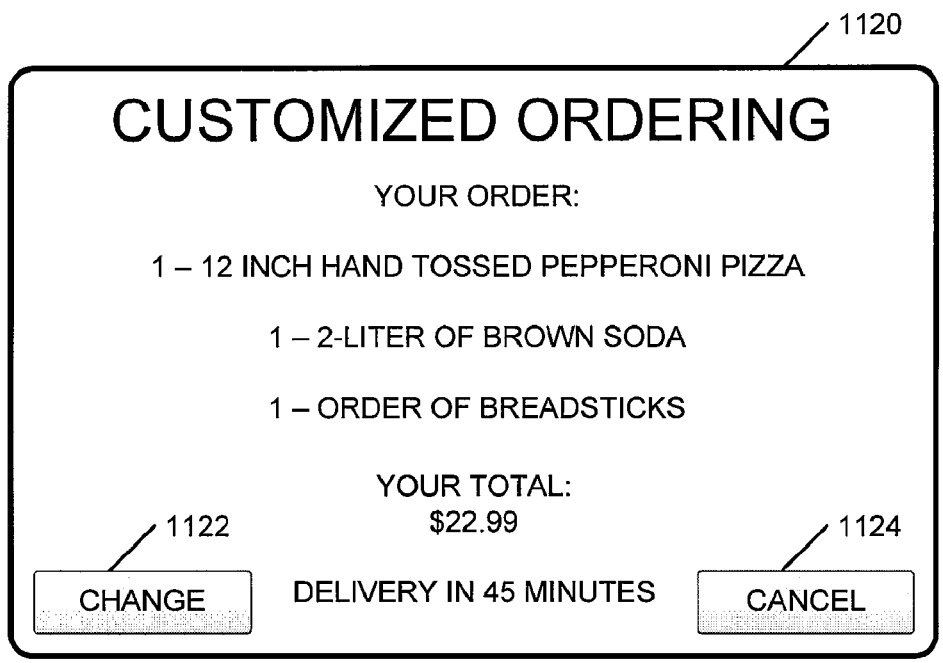
FIG. 11 is an exemplary embodiment of a user interface that may be presented to a user in response to receipt of a customized order, similar to the interface from FIG. 10.

FIG. 11 is an exemplary embodiment of a user interface 1120 that may be presented to a user in response to receipt of a customized order, similar to the interface 1020 from FIG. 10. As illustrated in the nonlimiting example of FIG. 11, in response to selecting one of the customized order option 1022a-1022h from FIG. 10, the user interface 1120 may be displayed, confirming the order. According to exemplary embodiments, the order displayed includes an order provided by a particular vendor and selected by the user to be associated with the ordering service described herein. For example, if a user consistently orders a 12 inch hand tossed pepperoni pizza, a 2-liter bottle of brown soda, and an order of breadsticks from the vendor Your Pizza Shack, then the user may decide to associate the order with the ordering service so that when the user selects the ordering option 1022a, the order including the pizza, bottle of soda and breadsticks is retrieved for order confirmation, as illustrated in FIG. 11, eliminating the need for the user step through a number of options to achieve the same order. If the user wishes to change the order, the user may select a change option 1122 to be presented with options for changing the order. If the user wishes to cancel the order, the user can select a cancel option 1124.

One should note that, depending on the particular configuration, the user may be presented with a intermediate user interface (not shown) to confirm that the order is being processed (similar to the user interface 720, from FIG. 7). Additionally, the user interface 1120 may also be configured to display a countdown for the expected delivery of the order. Similarly, some embodiments may be configured to display a current status and/or position of the order. As a nonlimiting example, referring back to a previous example, if the user orders a pizza from the vendor Your Pizza Shack, the user interface 1120 may be configured to determine (from the vendor computing device 112 and/or from other sources) whether the pizza is currently in the oven. If the pizza is out of the oven, the user interface 1120 may be configured to determine whether the order is currently in transit and, if so, the geographical position of the order.

Figure 12:
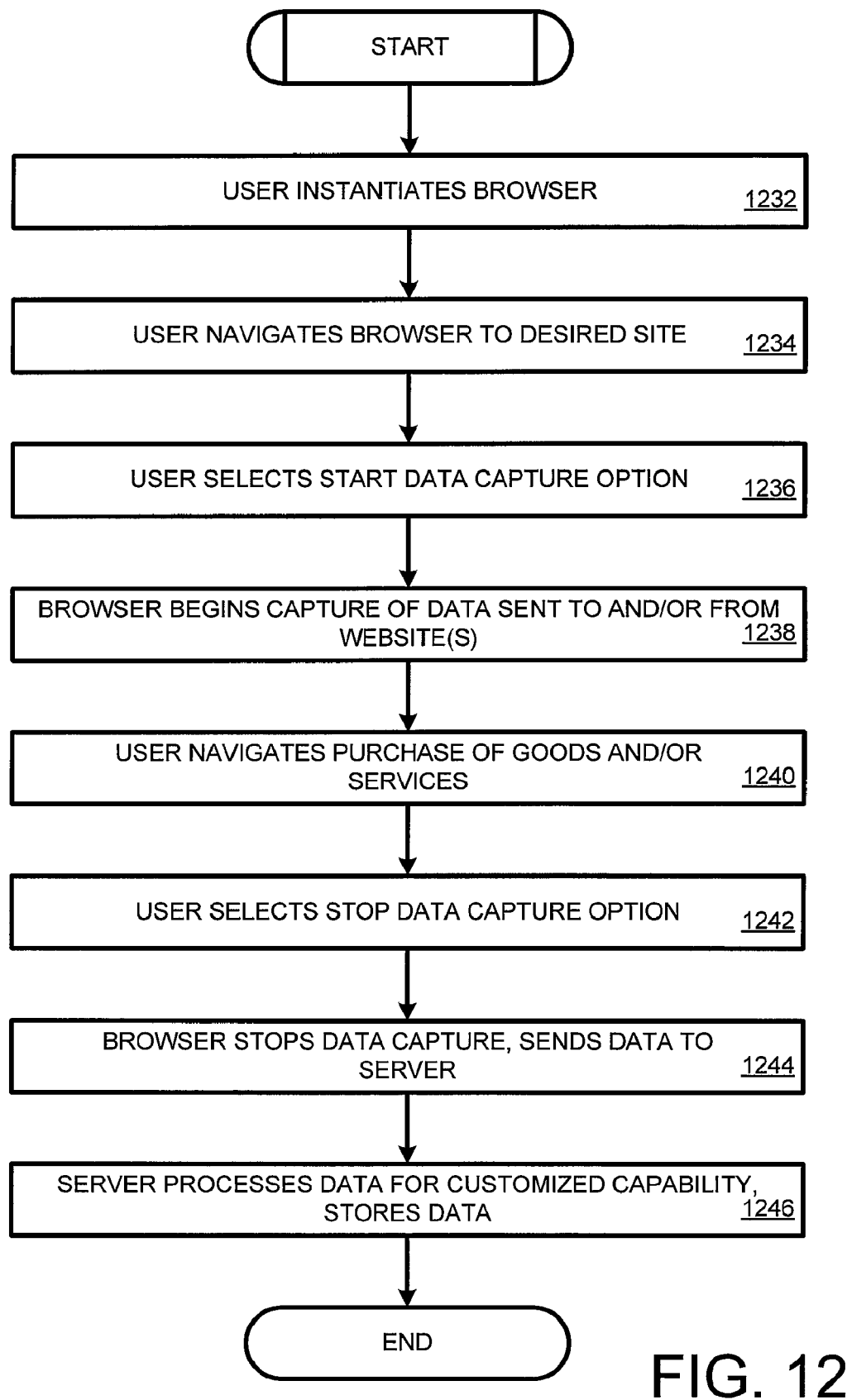
FIG. 12 is a flowchart illustrating an exemplary embodiment of a process that may be utilized for initializing a customized feature, such as in the network of FIG. 1.

FIG. 12 is a flowchart illustrating an exemplary embodiment of a process that may be utilized for initializing a customized feature, such as in the network of FIG. 1. As illustrated in the nonlimiting example of FIG. 12, a user can instantiate a browser (block 1232) associated with a user device, such as the user device 102b. The user can then navigate the browser to a desired website (block 1234). The user can select the start data capture option 326 (block 1236). The browser can then begin to capture data sent to and/or received from one or more websites that the user is browsing (block 1238). The user can then navigate one or more web pages during the purchase of goods and/or services (block 1240). The user can select the stop data capture option 327 (block 1242). The browser can stop data capture and send the captured data to the customized order server 106 (block 1244). The customized order server 106 can process the received data to determine whether customized ordering is plausible. Customized ordering may be plausible when the user has an account that is configured for customized ordering and/or in other scenarios. If customized ordering is plausible, the customized order server 106 determines data, such as ordering preferences, etc., which may be associated with a code that uniquely identifies the user that is associated with the order for future customized ordering. Additionally, the server 106 stores the determined data (block 1246).

One should note that the nonlimiting example described with reference to FIG. 12 illustrates an exemplary embodiment associated with customized ordering when the vendor is not registered with the customized service. Additionally, depending on the particular configuration, a similar process may be utilized, regardless of whether the vendor is registered. One should also note that in at least one exemplary embodiment the user device 102 is configured to process the captured data to determine future customized ordering procedures (e.g., blocks 1244, 1246).

Figure 13:
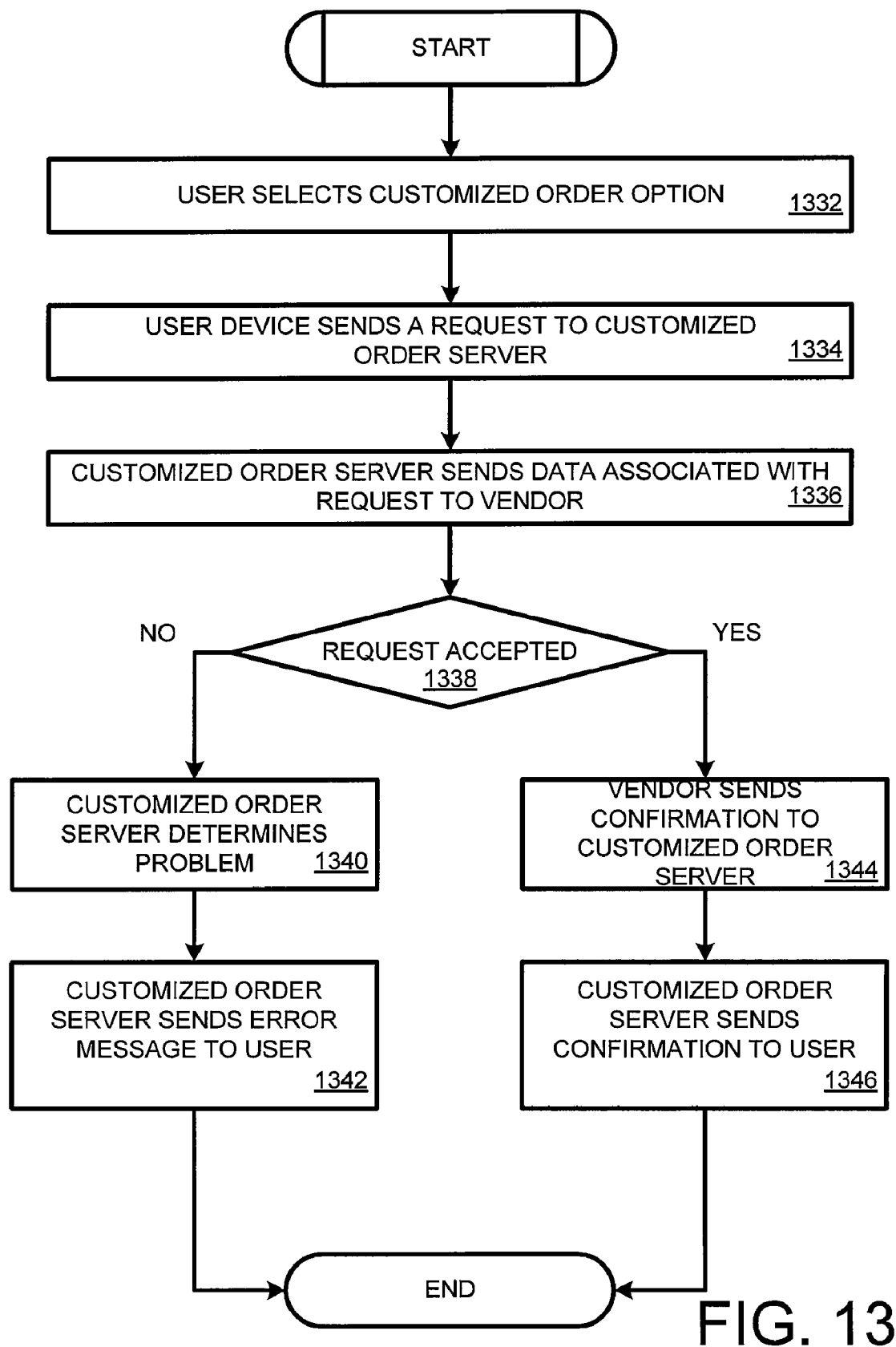
FIG. 13 is a flowchart illustrating an exemplary embodiment of a process that may be utilized for placing a customized order, similar to the flowchart from FIG. 12.

FIG. 13 is a flowchart illustrating an exemplary embodiment of a process that may be utilized for placing a customized order, similar to the flowchart from FIG. 12. As illustrated in the nonlimiting example of FIG. 13, a user may select a customized order option on a user device 102 (block 1332). The user device 102 can send an order request to the customized order server 106 (block 1334). The customized order server 106 can determine the order associated with the order request and send data associated with the order to the designated vendor (block 1336). A determination can then be made as to whether the order request is accepted by the vendor (block 1338). If the order request is not accepted (e.g., the vendor is not currently open, the vendor is not taking orders at this time, the customer has a past due balance, etc.), the customized order server 106 can determine the problem with the order request (block 1340). The customized order server 106 can then send an error message to the user device 102 (block 1342). If, at block 1338, the request is accepted, the vendor can send confirmation to the customized order server 106 (block 1344). The customized order server 106 can then send confirmation to the user device 102 (block 1346). As noted above, by using the order service described herein, the user may reduce the number of steps required to provide an order to a vendor.

Figure 14:
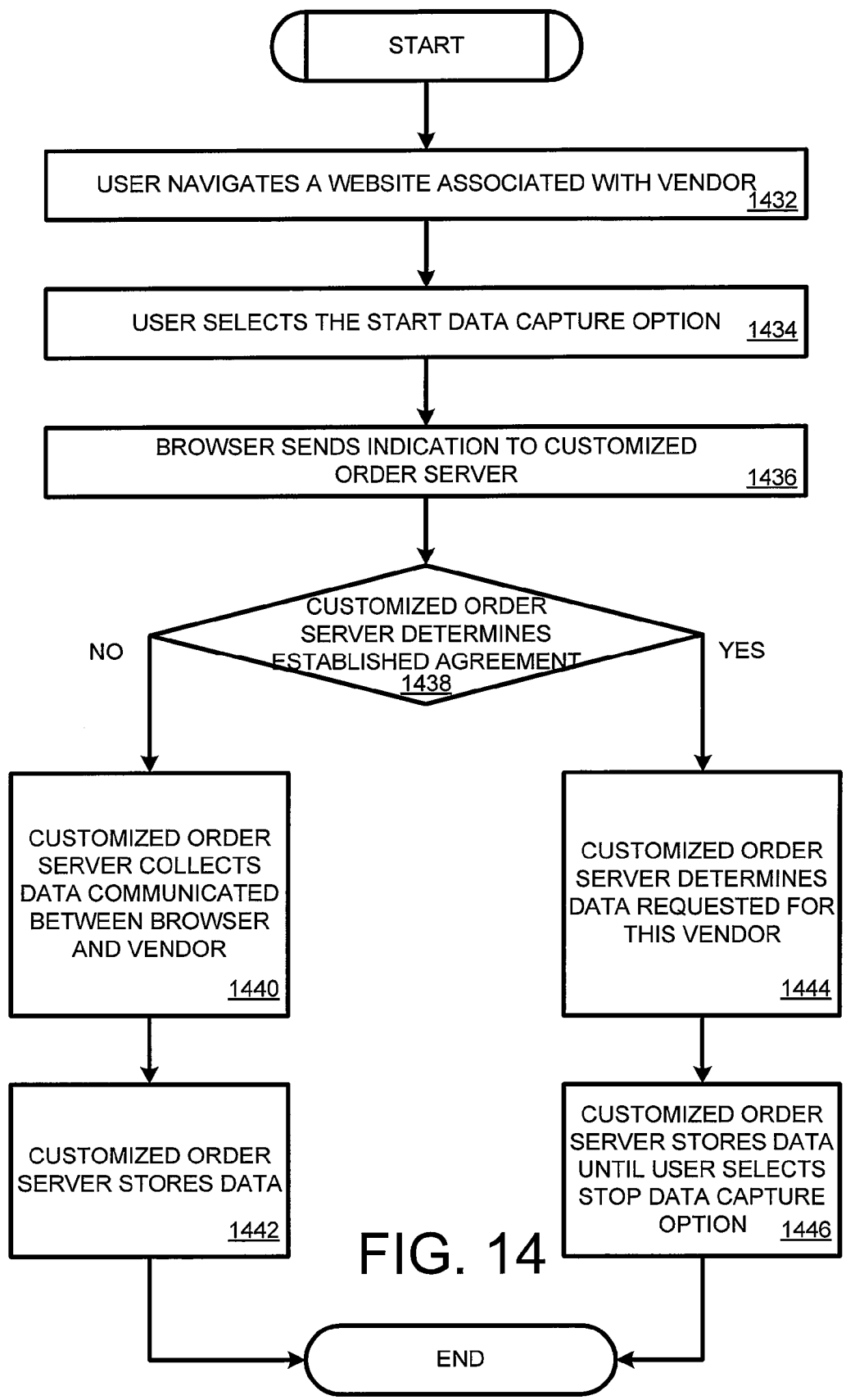
FIG. 14 is a flowchart illustrating an exemplary embodiment of a process that may be utilized for capturing data for customized ordering, similar to the flowchart from FIG. 13.

FIG. 14 is a flowchart illustrating an exemplary embodiment of a process that may be utilized for capturing data for customized ordering, similar to the flowchart from FIG. 13. As illustrated in the nonlimiting example of FIG. 14, a user can navigate a website associated with a vendor (block 1432). The user can select the start data capture option 266 (block 1434). The browser can send an indication to the customized order server 106 (block 1436). The customized order server 106 can then determine whether there is an established agreement between the customized order service provider and the vendor (block 1438). If there is no established agreement, the customized order server 106 can collect data communicated between the user's browser and the vendor (block 1440). The customized can then associate the retrieved data with the user and store the retrieved data (block 1442).

If, at block 1438, the customized order server 106 determines that there is an established agreement, the customized order server 106 can determine data requested by this vendor to facilitate customized ordering (block 1444). The customized order server 106 can then store the requested data as communicated between the user and vendor until the user selects stop data capture option 267 (block 1446).

One should note that, while the nonlimiting example of FIG. 14 illustrates that a determination can be made in response to selection of the start data capture option 266, this is a nonlimiting example. More specifically, in at least one exemplary embodiment, the customized order logic 299 may be configured to determine whether the vendor has an agreement with the customized order service provider upon the user accessing the vendor's website. Additionally, some embodiments may be configured to operate without utilizing the customized order server 106.

Figure 15:
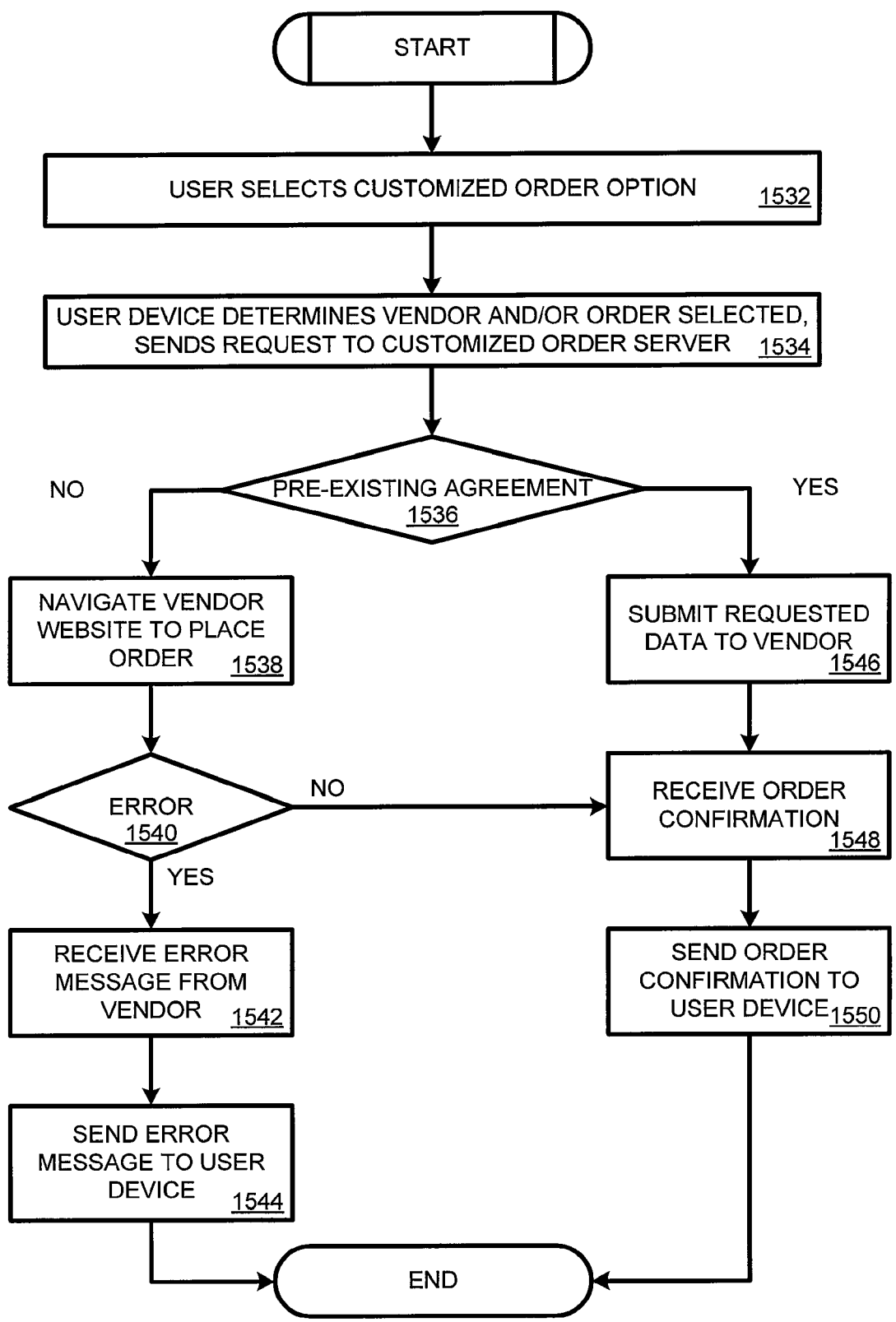
FIG. 15 is a flowchart illustrating an exemplary embodiment of a process that may be utilized for placing a customized order, similar to the flowchart from FIG. 14.

FIG. 15 is a flowchart illustrating an exemplary embodiment of a process that may be utilized for placing a customized order, similar to the flowchart from FIG. 14. As illustrated in the nonlimiting example of FIG. 15, a user can select a customized order option on user device 102 (block 1532). The user device 102 can determine the vendor and/or order that was selected (block 1534). A determination can then be made as to whether an agreement exists between the vendor and the customized order service provider (block 1536). If no agreement exists, the customized order logic 299 (which may be associated with the user device 102 and/or customized order server 106) can navigate the vendor website to place order (block 1538). One should note that the customized order logic 299 can navigate the vendor website according to previously captured data associated with this vendor. Additionally, while the exemplary embodiment of FIG. 15 discusses navigating a website, this is also a nonlimiting example, as some embodiments may be configured to send a facsimile to the vendor and/or place a telephone call with the vendor to place the order. Such configurations may utilize text-to-speech conversion techniques and/or other translation logic for converting the order into the desired format.

Upon placing the order, a determination can be made as to whether there is an error associated with the placed order (block 1540). If there is an error, the customized order server 106 can receive an error message from the vendor (block 1542). The customized order server 106 can then send the error message to the user device 102 (block 1544). If, at block 1540, there is not an error associated with the order, the flowchart can proceed to block 1548, discussed below.

If, at block 1536, a determination is made that an agreement exists between the vendor and the customized order service provider, the customized order server 106 can submit order data as requested by the vendor (block 1546). The customized order server 106 can then receive an order confirmation (block 1548). The customized order server 106 can then send the order confirmation to the user device 102 (block 1550).

Figure 16:
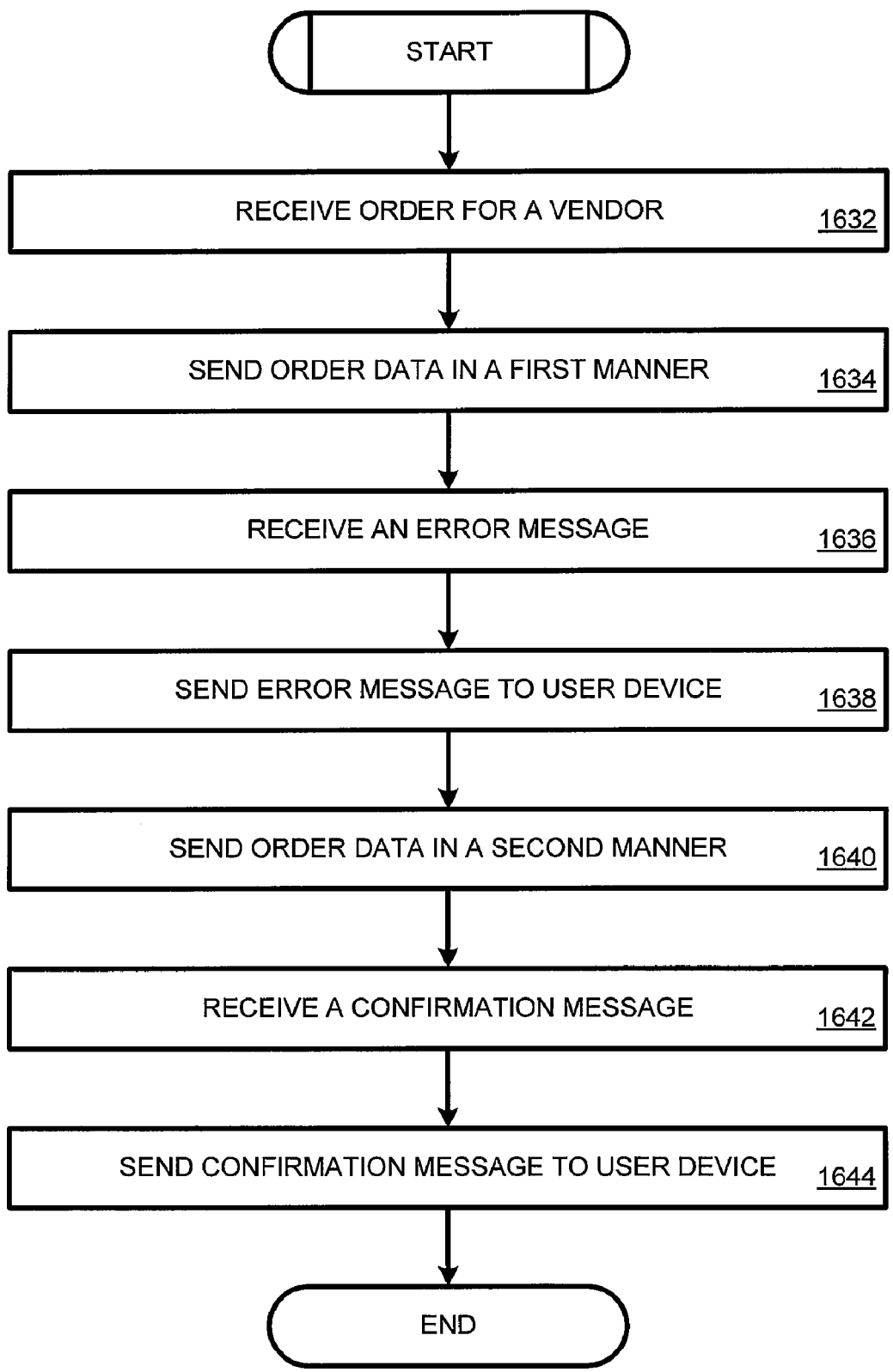
FIG. 16 is a flowchart illustrating an exemplary embodiment of a process that may be utilized for sending a customized order in a plurality of formats, similar to the flowchart from FIG. 15.

FIG. 16 is a flowchart illustrating an exemplary embodiment of a process that may be utilized for sending a customized order in a plurality of formats, similar to the flowchart from FIG. 15. As illustrated in the nonlimiting example of FIG. 16, the customized order server 106 can receive an order for a vendor (block 1632). The customized order server 106 can send the order data to the vendor in a first manner (block 1634). The first manner can include any of a plurality of techniques, including navigating the vendor's website, determining whether the vendor has an agreement with the customized order service provider, sending a facsimile message, placing a telephone call, etc. In response to sending the order data in a first manner, the customized order server 106 can receive an error message indicating that the order was not processed (block 1636). The customized order server 106 can then send an error message to the user device 102 (block 1638). The customized order server 106 can then send the order data in a second manner (block 1640). Sending the order data in a second manner can include sending the order data in a different manner than the first manner. More specifically, as a nonlimiting example, if the customized order server 106 first navigates the website, the customized order server 106 can send a facsimile message as the second manner. The customized order server 106 can then receive a confirmation message indicating that the order is being processed (block 1642). The customized order server 106 can then send the substance of the confirmation message to the user device 102 (block 1644).

One should note that while the nonlimiting example of FIG. 16 illustrates an exemplary embodiment where sending the order data in a first manner receives an error message, this is a nonlimiting example, used for illustration purposes only. More specifically, in at least one exemplary embodiment, the order data may be sent in a first manner and then a determination is made as to whether the order is processed. If the order is not processed, the customized order server 106 may send the order data in a second manner. If the order is processed, the customized order server 106 may proceed as in blocks 1642 and 1644. Similarly, while the nonlimiting example of FIG. 16 illustrates sending the order data in a first manner and a second manner, one should note that the customized order server 106 may send the order data in any number of different manners until the order is processed. Additionally, the customized order server 106 may also send the order data in a first manner (or second manner, etc.) any number of times until the order is processed.

Figure 17:
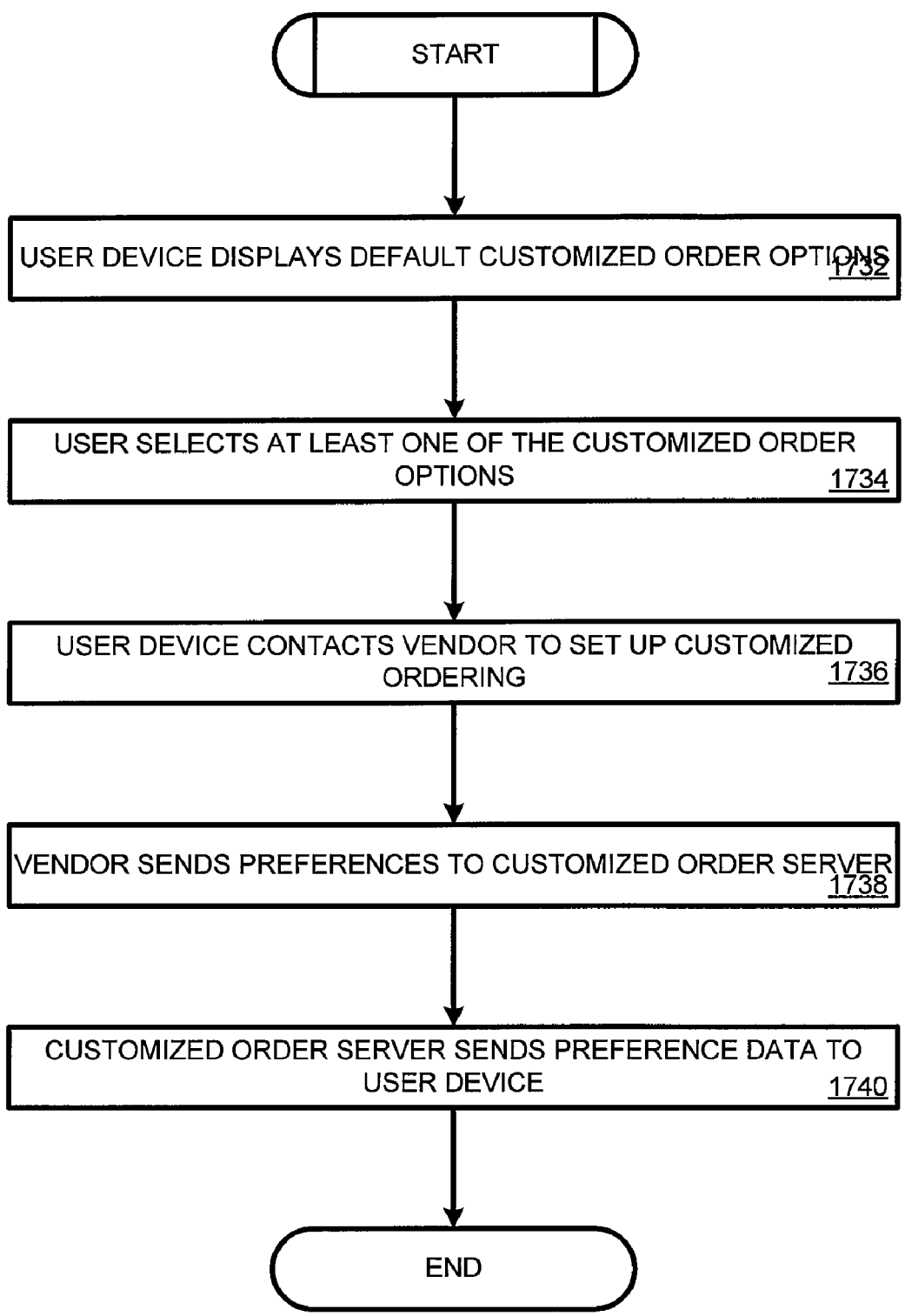
FIG. 17 is a flowchart illustrating an exemplary embodiment of a process that may be utilized for initiating customized ordering, similar to the flowchart from FIG. 16.

FIG. 17 is a flowchart illustrating an exemplary embodiment of a process that may be utilized for initiating customized ordering, similar to the flowchart from FIG. 16. As illustrated in the nonlimiting example of FIG. 17, a user device 102 displays default customized order options (block 1732). More specifically, depending on the vendors that the customized order service provider has obtained agreements, a default listing of vendors may be displayed when the user device 102 is first used. The user can then select at least one of the customized order options (block 1734). The user device may then contact the vendor associated with the selected option to set up customized ordering (block 1736). As discussed above, in some embodiments, the user device 102 may be configured to directly contact the vendor. Similarly, some embodiments may be configured such that the user device 102 contacts the customized order server 106, which then communicates with the vendor. Upon setting up the customized order options for ordering with the user, the vendor can then send the preferences to the customized order server 106 (block 1738). The customized order server can then send the preference data to the user device 102 (block 1740).

The embodiments disclosed herein can be implemented in hardware, software, firmware, or a combination thereof. At least one embodiment, disclosed herein is implemented in software and/or firmware that is stored in a memory and that is executed by a suitable instruction execution system. If implemented in hardware, as in an alternative embodiment embodiments disclosed herein can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

One should also note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

The invention claimed is:

1. A method for customized ordering, comprising:
receiving, by at least one computer, browser captured data corresponding to an order submitted by the user to a vendor and saving order details within the browser captured data as a previously created customized order;
subsequently receiving, by the at least one computer, an indication to send the previously created customized order to the vendor;

retrieving, by the at least one computer, at least one component of the previously created customized order according to the indication;

determining, by the at least one computer, the vendor associated with the previously created customized order; and sending, by the at least one computer, the at least one component of the previously created customized order to the vendor in a first manner, the vendor being configured to receive the previously created customized order.

2. The method of claim 1, further comprising determining whether the vendor has established an agreement with a customized order service provider.

3. The method of claim 2, further comprising, in response to determining that the vendor has established an agreement with the customized order service provider, determining a format for sending the previously created customized order to the customized order service provider.

4. The method of claim 2, further comprising, in response to determining that the vendor has not established an agreement with the customized order service provider, navigating a website associated with the vendor to place the previously created customized order.

5. The method of claim 1, further comprising:
  determining whether the previously created customized order is processed;
  in response to determining that the previously created customized order has been processed, receiving a confirmation; and
  sending at least a portion of the confirmation to a user device that sent the indication to place the previously created customized order.

6. The method of claim 1, further comprising:
  determining whether the previously created customized order is processed;
  in response to determining that the previously created customized order has not been processed, determining a second manner to send the previously created customized order; and
  sending the previously created customized order in the determined second manner.

7. The method of claim 6, wherein sending the previously created customized order in a first manner includes at least one of the following: sending the previously created customized order in a format associated with the vendor, navigating a website associated with the vendor, sending a facsimile message, and placing a telephone call, wherein sending the previously created customized order in a second manner includes at least one of the following: sending the previously created customized order in a format associated with the vendor, navigating a website associated with the vendor, sending a facsimile message, and placing a telephone call, and wherein the first manner is different than the second manner.

8. A non-transitory computer readable medium for customized ordering, comprising:
  first receiving logic configured to receive browser captured data corresponding to an order submitted by the user to a vendor and saving order details within the browser captured data as a previously created customized order;
  second receiving logic configured to subsequently receive an indication to send the previously created customized order to the vendor;
  retrieving logic configured to retrieve at least one component of the previously created customized order according to the indication;
  first determining logic configured to determine the vendor associated with the previously created customized order; and
  first sending logic configured to send the previously created customized order to the vendor in a first manner, the vendor being configured to receive the previously created customized order.

9. The non-transitory computer readable medium of claim 8, further comprising second determining logic configured to determine whether the vendor has established an agreement with a customized order service provider.

10. The non-transitory computer readable medium of claim 9, further comprising, third determining logic configured to, in response to the second determining logic determining that the vendor has established an agreement with the customized order service provider, determine a format for sending the previously created customized order to the customized order service provider.

11. The non-transitory computer readable medium of claim 9, further comprising, navigating logic configured to, in response to determining that the vendor has not established an agreement with the customized order service provider, navigate a website associated with the vendor to place the previously created customized order.

12. The non-transitory computer readable medium of claim 8, further comprising:
  fourth determining logic configured to determine whether the previously created customized order is processed;
  third receiving logic configured to, in response to determining that the previously created customized order has been processed, receive a confirmation; and
  second sending logic configured to send at least a portion of the confirmation to a user device that sent the indication to place the previously created customized order.

13. The non-transitory computer readable medium of claim 8, further comprising:
  fifth determining logic configured to determine whether the previously created customized order is processed;
  sixth determining logic configured to, in response to determining that the previously created customized order has not been processed, determine a second manner to send the previously created customized order; and
  third sending logic configured to send the previously created customized order in the determined second manner.

14. The non-transitory computer readable medium of claim 13, wherein sending the previously created customized order in a first manner includes at least one of the following: sending the previously created customized order in a format associated with the vendor, navigating a website associated with the vendor, sending a facsimile message, and placing a telephone call, wherein sending the previously created customized order in a second manner includes at least one of the following: sending the previously created customized order in a format associated with the vendor, navigating a website associated with the vendor, sending a facsimile message, and placing a telephone call, and wherein the first manner is different than the second manner.

15. A server for customized ordering, comprising:
  a first receiving component configured to receive browser captured data corresponding to an order submitted by the user to a vendor and saving order details within the browser captured data as a previously created customized order;
  a second receiving component configured to subsequently receive an indication to send the previously created customized order to the vendor;

a retrieving component configured to retrieve at least one component of the previously created customized order according to the indication;

a first determining component configured to determine the vendor associated with the previously created customized order; and a first sending component configured to send the previously created customized order to the vendor in a first manner, the vendor being configured to receive the previously created customized order.

16. The server of claim 15, further comprising a second determining component configured to determine whether the vendor has established an agreement with a customized order service provider.

17. The server of claim 16, further comprising, a third determining component configured to, in response to the second determining component determining that the vendor has established an agreement with the customized order service provider, determine a format for sending the previously created customized order to the customized order service provider.

18. The server of claim 16, further comprising, a navigating component configured to, in response to determining that the vendor has not established an agreement with the customized order service provider, navigate a website associated with the vendor to place the previously created customized order.

19. The server of claim 15, further comprising:

a fourth determining component configured to determine whether the previously created customized order is processed;

a third receiving component configured to, in response to determining that the previously created customized order has been processed, receive a confirmation; and a second sending component configured to send at least a portion of the confirmation to a user device that sent the indication to place the previously created customized order.

20. The server of claim 15, further comprising:

a fifth determining component configured to determine whether the previously created customized order is processed;

a sixth determining component configured to, in response to determining that the previously created customized order has not been processed, determine a second manner to send the previously created customized order; and a third sending component configured to send the previously created customized order in the determined second manner.

* * * * *